(12) United States Patent
Bensmann et al.

(10) Patent No.: US 11,975,833 B2
(45) Date of Patent: May 7, 2024

(54) WING FOR AN AIRCRAFT

(71) Applicant: Airbus Operations GmbH, Hamburg (DE)

(72) Inventors: Stefan Bensmann, Hamburg (DE); Martin Fees, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/897,563

(22) Filed: Aug. 29, 2022

(65) Prior Publication Data

US 2023/0064922 A1 Mar. 2, 2023

(30) Foreign Application Priority Data

Aug. 31, 2021 (EP) ..................... 21194159

(51) Int. Cl.
*B64C 3/28* (2006.01)
*B64C 9/26* (2006.01)

(52) U.S. Cl.
CPC . *B64C 3/28* (2013.01); *B64C 9/26* (2013.01)

(58) Field of Classification Search
CPC ................ B64C 9/22; B64C 9/24; B64C 9/26
See application file for complete search history.

(56) References Cited

U.S. PATENT DOCUMENTS

| | | |
|---|---|---|
| 4,753,402 A | 6/1988 | Cole |
| 2010/0163685 A1 | 7/2010 | Vormezeele et al. |

FOREIGN PATENT DOCUMENTS

| | | | | |
|---|---|---|---|---|
| EP | 0230681 A2 | 8/1987 | | |
| EP | 0414531 A2 | 2/1991 | | |
| GB | 2213113 A | * 8/1989 | ............... | B64C 9/22 |
| GB | 2213113 A | 8/1989 | | |
| WO | 2008110521 A1 | 9/2008 | | |
| WO | WO-2008110521 A1 | * 9/2008 | ............... | B64C 9/22 |
| WO | 2021104810 A1 | 6/2021 | | |
| WO | WO-2021104810 A1 | * 6/2021 | ............... | B64C 3/28 |

OTHER PUBLICATIONS

European Search Report; priority document.

* cited by examiner

*Primary Examiner* — Philip J Bonzell
*Assistant Examiner* — Eric Acosta
(74) *Attorney, Agent, or Firm* — Greer, Burns & Crain, Ltd.

(57) ABSTRACT

A wing for an aircraft, including a main wing, and a leading edge high lift assembly including a high lift body, and a connection assembly connecting the high lift body to the main wing such that the high lift body is movable relative to the main wing between stowed and deployed positions. The connection assembly includes a first connection element mounted to the high lift body and movably mounted to the main wing. The connection assembly includes a second connection element mounted to the high lift body spaced apart from the first connection element in a span direction, and movably mounted to the main wing. The connection assembly includes an additional support device arranged spaced apart from the first and second connection elements and configured to support the high lift body at the main wing against movement or deformation of the high lift body relative to the main wing.

15 Claims, 7 Drawing Sheets

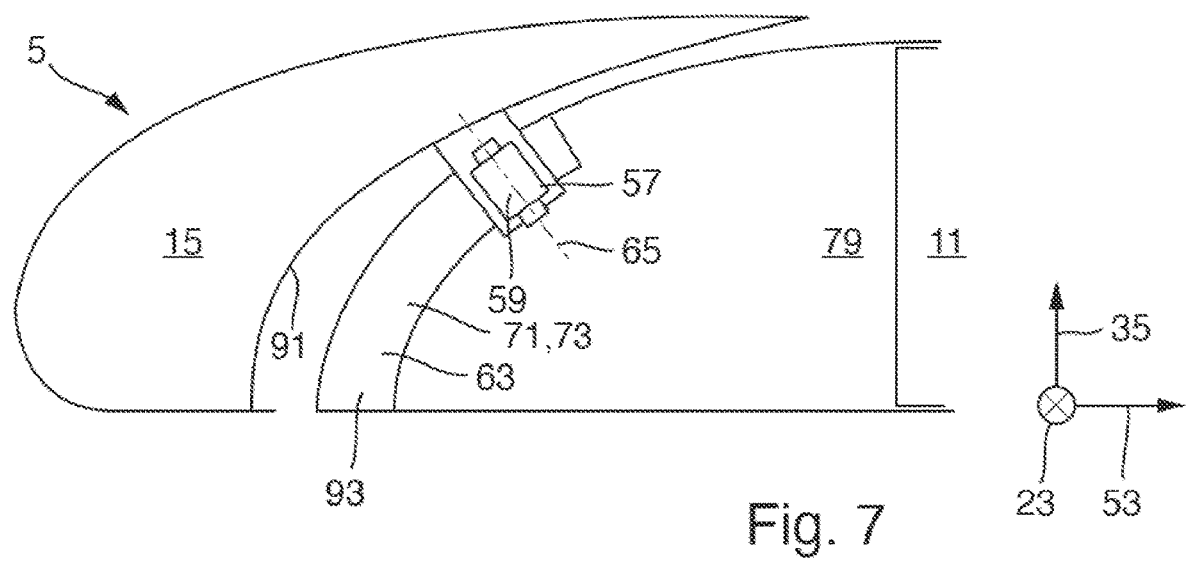
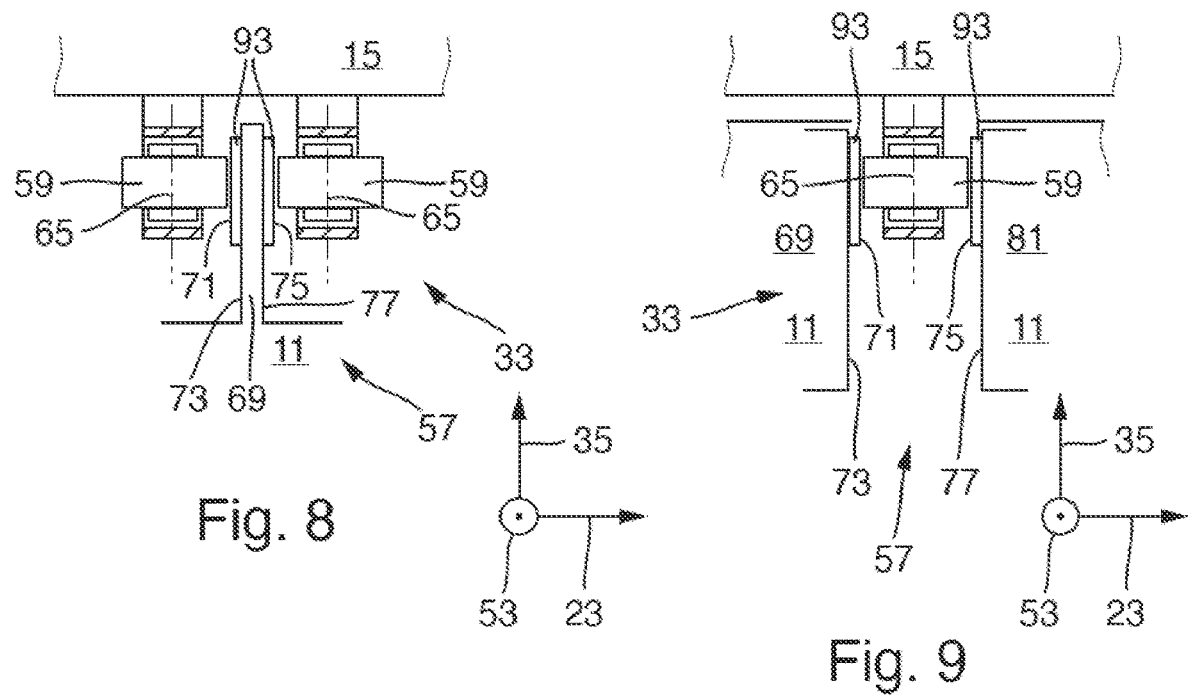

WING FOR AN AIRCRAFT

CROSS-REFERENCES TO RELATED APPLICATIONS

This application claims the benefit of the European patent application No. 21194159.6 filed on Aug. 31, 2021, the entire disclosures of which are incorporated herein by way of reference.

FIELD OF THE INVENTION

The present invention relates to a wing for an aircraft. Further aspects of the invention relate to a leading edge high lift assembly for such a wing as well as to an aircraft comprising such a leading edge high lift assembly and/or such a wing.

The wing comprises a main wing and a leading edge high lift assembly movable relative to the main wing to increase lift of the wing. The leading edge high lift assembly comprises a high lift body and a connection assembly. The high lift body is preferably a droop high lift body referred to as droop nose, droop leading edge, droop flap or a slat. The connection assembly is configured for connecting the high lift body to the main wing, in particular to the leading edge of the main wing, in such a way that the high lift body is movable relative to the main wing between a stowed position and a deployed position. The stowed position relates to a position where the wing profile has a lower curvature and/or shorter chord extension and might also be referred to as straight position, normal position, cruise position or retracted position, while the deployed position relates to a position where the wing profile has a higher curvature and/or longer chord extension and might also be referred to as drooped position, landing position or extended position.

The connection assembly comprises a first connection element that is mounted to the high lift body and that is movably mounted to the main wing. The connection assembly further comprises a second connection element that is mounted to the high lift body in a position spaced apart from the first connection element in a span direction, and that is movably mounted to the main wing.

In case that the high lift body is formed as a droop nose, the first and second connection elements might be formed as rotation elements, such as hinge arms, rotation rods or as parts of the high lift body structure, that are mounted to the high lift body and that are mounted to the main wing rotatably about an axis of rotation. The rotation element might be mounted to the high lift body directly or indirectly and in a fixed or rotatable manner, preferably in a fixed, non-rotatable manner, e.g., by a hinge between the end of the rotation element and the high lift body and additionally by a fixing link that is hinged to the rotation element and that is hinged to the high lift body spaced apart from the rotation element, so that a relative rotation of the high lift body and the rotation element is prevented. The axis of rotation is preferably arranged at a lower part of the main wing near or at a lower skin and preferably extends in parallel to the span direction and/or in parallel to the extension of leading edge along the wing, so that the high lift body is preferably rotated about the axis of rotation when moved between the stowed position and the deployed position.

However, in case that the high lift body is formed as a slat, the first and second connection elements might be formed as slat tracks guided at the main wing for movement along a predetermined path that might be straight or curved around a center that lies far outside the wing profile, or might be formed as a linkage rotatably mounted to the main wing and rotatably mounted to the high lift body.

Similar wings are known in the art. At the known wings it may happen, in particular when the first and second connection elements are arranged with a greater distance from another, that the portion of the high lift body between the two connection elements bends under air loads, so that in the stowed position of the high lift body there might be no smooth transition in this area between the trailing edge of the high lift body and the leading edge of the main wing, which however is advantageous for aerodynamic reasons. Also, the high lift bodies of some known wings are spanwise supported only by side struts rotatably linked at the main wing and rotatably linked at the high lift body and extending at least partly in span direction, which add weight and complexity to the wing.

Therefore, an object of the present invention is to provide a wing comprising a simple, lightweight and aerodynamically optimized leading edge high lift assembly.

SUMMARY OF THE INVENTION

This object is achieved in that the connection assembly comprises an additional support device arranged spaced apart from the first and second connection elements and configured to support the high lift body at the main wing against movement or deformation of the high lift body, i.e., to restrict movement or deformation of the high lift body, in particular in a wing thickness direction, i.e., at least with a share in the wing thickness direction, and/or in a span direction, i.e., at least with a share in the span direction, relative to the main wing. There might also be more than one additional support devices provided per high lift body. By such an additional support, bending of the high lift body between the first and second connection elements under air loads and/or spanwise movement of the high lift body can be reliably restricted, so that the leading edge high lift assembly is particularly simple, lightweight and aerodynamically advantageous.

According to a preferred embodiment, the additional support device is arranged, preferably centrally, between the first connection element and the second connection element. In such a way, bending of the high lift body between the first and second connection elements under air loads and/or spanwise movement of the high lift body can be most efficiently restricted without introducing additional bending moments into the high lift body. However, it is also possible that the additional support device is arranged outboard or inboard of the first or second connection element.

According to another preferred embodiment, the additional support device comprises a hold down device configured to support the high lift body at the main wing against upwards movement of the high lift body relative to the main wing, i.e., to restrict upwards movement of the high lift body relative to the main wing, when the high lift body is in the stowed position. The term "upwards" is with respect to a normal position of the associated aircraft on the ground. The upwards movement might also be interpreted as a movement in the wing thickness direction towards the upper wing surface. By such a hold down device bending of the high lift body between the first and second connection elements under air loads can be restricted in a simple and efficient way.

In particular, it is preferred that the hold down device comprises a first stop element mounted, preferably fixedly mounted, to the high lift body and a second stop element mounted, preferably fixedly mounted, to the main wing. The first and second stop elements are configured to rest against one another when the high lift body is in the stowed position to support the high lift body at the main wing against upwards movement of the high lift body relative to the main wing. Preferably, the first stop element and/or the second stop element might be adjustable in the contact direction, e.g., might include an adjustable screw, wherein contact is preferably established by the screw head. By such first and second stop elements a simple and reliable hold down device can be realized.

It is further preferred that the first and second stop elements are configured to rest against one another within a contact plane. The contact plane extends in a plane spanned by the span direction and a chord direction, or at least has a share in a plane spanned by the span direction and the chord direction. This means a contact force transferred between the first and second stop elements, which results from an upwards movement of the high lift body being restricted by the hold down device, extends normal to the contact plane or at least has a share normal to the contact plane, so that an efficient load transfer between the first and second stop elements is enabled.

According to a preferred embodiment, the additional support device comprises a lateral support device configured to support the high lift body at the main wing against spanwise movement of the high lift body relative to the main wing, i.e., to restrict spanwise movement of the high lift body relative to the main wing, when the high lift body is moved between the stowed position and the deployed position, including when the high lift body is in the stowed position and in the deployed position. By such a lateral support spanwise movement of the high lift body can be restricted at all times in a simple and efficient way.

If only the additional support device is used to transfer the lateral loads of the high lift body, the additional support device is preferably formed in a fail-safe manner for lateral loads. This means preferably, the load path is fails-safe, e.g., by additional rollers or slide pads, contact plates, or back-to-back blades, or multiple load paths are provided, e.g., by providing another additional support device spaced from the first additional support device by a lateral gap and transferring lateral loads when the first additional support device fails.

In particular, it is preferred that the lateral support device comprises a roller or slide bearing including at least one roller or slide pad mounted to one of the high lift body and the main wing, and engaging a corresponding guide surface at the other one of the high lift body and the main wing, so that the roller rolls or the slide pad slides along the guide surface when the high lift body is moved between the stowed position and the deployed position, thereby providing a load support in the span direction. By such a roller or slide bearing a simple, reliable and efficient lateral support is realized.

It is further preferred that the guide surface and/or a rotation axis of the roller extend in a chord plane spanned by the chord direction and the wing thickness direction. In such a way, a load support in the lateral direction is enabled.

It is also preferred that the lateral support device comprises a first blade preferably extending in the chord plane, mounted to the high lift body and having a first guide surface at a first side and a second guide surface at an opposite second side. The lateral support device preferably further comprises a pair of rollers or slide pads mounted to the main wing, preferably to a rib of the main wing, and engaging the first and/or second guide surfaces from opposite sides. In such a way, a simple and efficient lateral support device is realized wherein only one blade is required mounted to the high lift body.

Alternatively, it is preferred that the lateral support device comprises a first blade and a second blade both mounted to the high lift body preferably in parallel to one another and having a first guide surface and a second guide surface facing towards each other and preferably extending in the chord plane. The lateral support device preferably further comprises a roller or slide pad mounted to the main wing, preferably to a rib of the main wing, and guided between the first and second blades in engagement with the first guide surface and/or the second guide surface. In such a way, a simple and efficient lateral support device is realized wherein only one roller or slide pad is required mounted to the main wing.

Alternatively, it is preferred that the lateral support device comprises a first blade preferably extending in the chord plane, mounted to the main wing, preferably to a rib of the main wing, and having a first guide surface at a first side and a second guide surface at an opposite second side. The lateral support device preferably further comprises a pair of rollers or slide pads mounted to the high lift body and engaging the first and/or second guide surfaces from opposite sides. In such a way, a simple and efficient lateral support device is realized wherein only one blade is required mounted to the main wing.

Alternatively, it is preferred that the lateral support device comprises a first blade and a second blade both mounted to the main wing, preferably to a rib of the main wing, preferably in parallel to one another and having a first guide surface and a second guide surface facing towards each other and preferably extending in the chord plane. The lateral support device preferably further comprises a roller or slide pad mounted to the high lift body and guided between the first and second blades in engagement with the first guide surface and/or the second guide surface. In such a way, a simple and efficient lateral support device is realized wherein only one roller or slide pad is required mounted to the high lift body.

According to a preferred embodiment, the first blade and/or the second blade have a profile, preferably a T-, L- or C-shaped profile, including a blade portion preferably having the guide surfaces, and a flange portion mounted to the high lift body or to the main wing, e.g., by bolts. Preferably, the flange portion is mounted to the lower and/or rearward panel of high lift body. In such a way, a simple and reliable structure is formed.

In particular, it is preferred that the first blade and/or the second blade is formed as or integrally formed with a rib of the main wing, preferably extending in a chord direction. In such a way, a simple and reliable structure is formed.

According to a preferred embodiment, at least one contact plate preferably formed of a hard material, such as steel, titanium, or ceramic, is mounted to the first and/or second blades and includes the first and/or second guiding surfaces to reinforce the first and/or second guiding surfaces, in particular in cases where the first and/or second blades are formed of a softer material, such as aluminum. In such a way, reliable and durable guide surfaces are formed.

According to a preferred embodiment, the first stop element is mounted to or formed integrally with the first and/or second blade. Additionally or alternatively, the second stop element is mounted to or formed integrally with a rib of the main wing. In such a way, a simple and reliable hold down device is formed.

In particular, it is preferred that the first stop element includes a first stop flange preferably formed at the lower or front end of the first and/or second blade and extending in the span direction. Additionally or alternatively, the second stop element includes a second stop flange formed at a rib of the main wing and extending in the span direction. In such a way, a simple and reliable hold down device is formed.

Alternatively, it is preferred that the first stop element is formed as a chordwise extension of the first and/or second blade and is preferably formed at the lower or front end of the first and/or second blade. Additionally or alternatively, the second stop element is formed as a chordwise extending projection at a rib of the main wing. In such a way, another simple and reliable hold down device is formed.

Alternatively, it is preferred that the first stop element is formed at the upper or rear end of the first and/or second blade, preferably at the head end of the first and/or second blade. Additionally or alternatively, the second stop element is formed as a chordwise and/or spanwise extending projection at a rib of the main wing. In such a way, another simple and reliable hold down device is formed.

According to a preferred embodiment, the additional support device comprises a deployment stop limiting deployment movement of the high lift body and thereby defining the deployed position of the high lift body. In such a way, the deployment stop can be easily integrated into the wing and reliable limit deployment of the high lift body.

In particular, it is preferred that the deployment stop comprises at least one lateral projection extending from the first and/or second guide surface of the first and/or second blade in the span direction and running against, i.e., stopping at, at least one roller or slide pad when the high lift body is in the deployed position. In such a way, a simple and reliable deployment stop is formed.

According to a preferred embodiment, the high lift body might be in the form of a droop nose, wherein the first connection element is in the form of a first rotation element, such as a hinge arm, preferably fixedly mounted to the high lift body and mounted to the main wing rotatably about a first rotation axis, and wherein the second connection element is in the form of a second rotation element, such as a hinge arm, preferably fixedly mounted to the high lift body and mounted to the main wing rotatably about a second rotation axis preferably parallel or coaxial to the first rotation axis. Preferably, the first and second rotation axes are arranged within or at the profile of the main wing. In such a way, the high lift body is moved on a circular path around the first and second rotation axes. Preferably, the wing comprises a rotating actuator for driving the rotation element about the axis of rotation. The additional support device according to the invention is particularly advantageous for a high lift body in the form of a droop nose.

Alternatively, it is preferred that the high lift body is in the form of a slat, wherein the first and second connection elements are formed as slat tracks movably guided at the main wing along a predetermined straight or curved path, or are formed as linkages rotatably mounted to the main wing and mounted to the slat. The additional support device according to the invention is also advantageous for a high lift body in the form of a slat.

A further aspect of the invention relates to a leading edge high lift assembly for the wing according to any of the afore-described embodiments. The leading edge high lift assembly comprises a high lift body and a connection assembly for connecting the high lift body to a main wing in such a way that the high lift body is movable relative to the main wing between a stowed position and a deployed position. The connection assembly comprises a first connection element that is mounted to the high lift body and that is configured to be movably mounted to the main wing. The connection assembly comprises a second connection element that is mounted to the high lift body in a position spaced apart from the first connection element in a span direction, and that is configured to be movably mounted to the main wing. The connection assembly comprises an additional support device arranged spaced apart from the first and second connection elements and configured to support the high lift body at the main wing against movement of the high lift body relative to the main wing. Features and effects described above in connection with the wing apply vis-a-vis also to the leading edge high lift assembly.

A further aspect of the invention relates to an aircraft comprising the wing according to any of the afore-described embodiments and/or comprising the leading edge high lift assembly according to any of the afore described embodiments. Features and effects described above in connection with the wing and in connection with the leading edge high lift assembly apply vis-a-vis also to the aircraft.

BRIEF DESCRIPTION OF THE DRAWINGS

Preferred embodiments of the present invention are explained hereinafter in more detail by means of a drawing. The drawing shows in FIG. 1 a perspective view of an aircraft according to the invention, FIG. 2 a top view of a wing according to an embodiment of the invention, FIG. 3 a cross-sectional view across the span direction of a wing according to an embodiment of the invention, showing the first connection element and the high lift body movable between the stowed position and the deployed position, FIG. 4 a cross-sectional view across the span direction of a wing according to an embodiment of the invention, showing the additional support device in the form of a hold down device, FIG. 5 a cross-sectional view across the span direction of a wing according to an embodiment of the invention, showing the additional support device in the form of a lateral support device, FIG. 6 a detailed cross-sectional view across the chord direction of the additional support device of the wing shown in FIG. 5, FIG. 7 a cross-sectional view across the span direction of a wing according to a further embodiment of the invention, showing the additional support device in the form of a lateral support device, FIG. 8 a detailed cross-sectional view across the chord direction of the additional support device of the wing shown in FIG. 7 according to a first embodiment, FIG. 9 a detailed cross-sectional view across the chord direction of the additional support device of the wing shown in FIG. 7 according to a second embodiment, FIG. 10 a cross-sectional view across the span direction of a wing according to a further embodiment of the invention, showing the additional support device including a lateral support device as well as first and second stop elements according to a first embodiment, FIG. 11 a cross-sectional view across the span direction of a wing according to a further embodiment of the invention, showing the additional support device including a lateral support device as well as first and second stop elements according to a second embodiment, FIG. 12 a cross-sectional view across the span direction of a wing according to a further embodiment of the invention, showing the additional support device including a lateral support device as well as first and second stop elements according to a third embodiment, FIG. 13 a detailed cross-sectional view across the chord direction of the additional support device of the wing shown in FIG. 12, FIG. 14 a cross-sectional view across the span direction of a wing according to a further embodiment of the invention, showing the additional support device including a lateral support device as well as a deployment stop, and FIG. 15 three detailed cross-sectional views across the chord direction of the additional support device of the wing shown in FIG. 14.

DETAILED DESCRIPTION OF THE PREFERRED EMBODIMENTS

Figure 1:
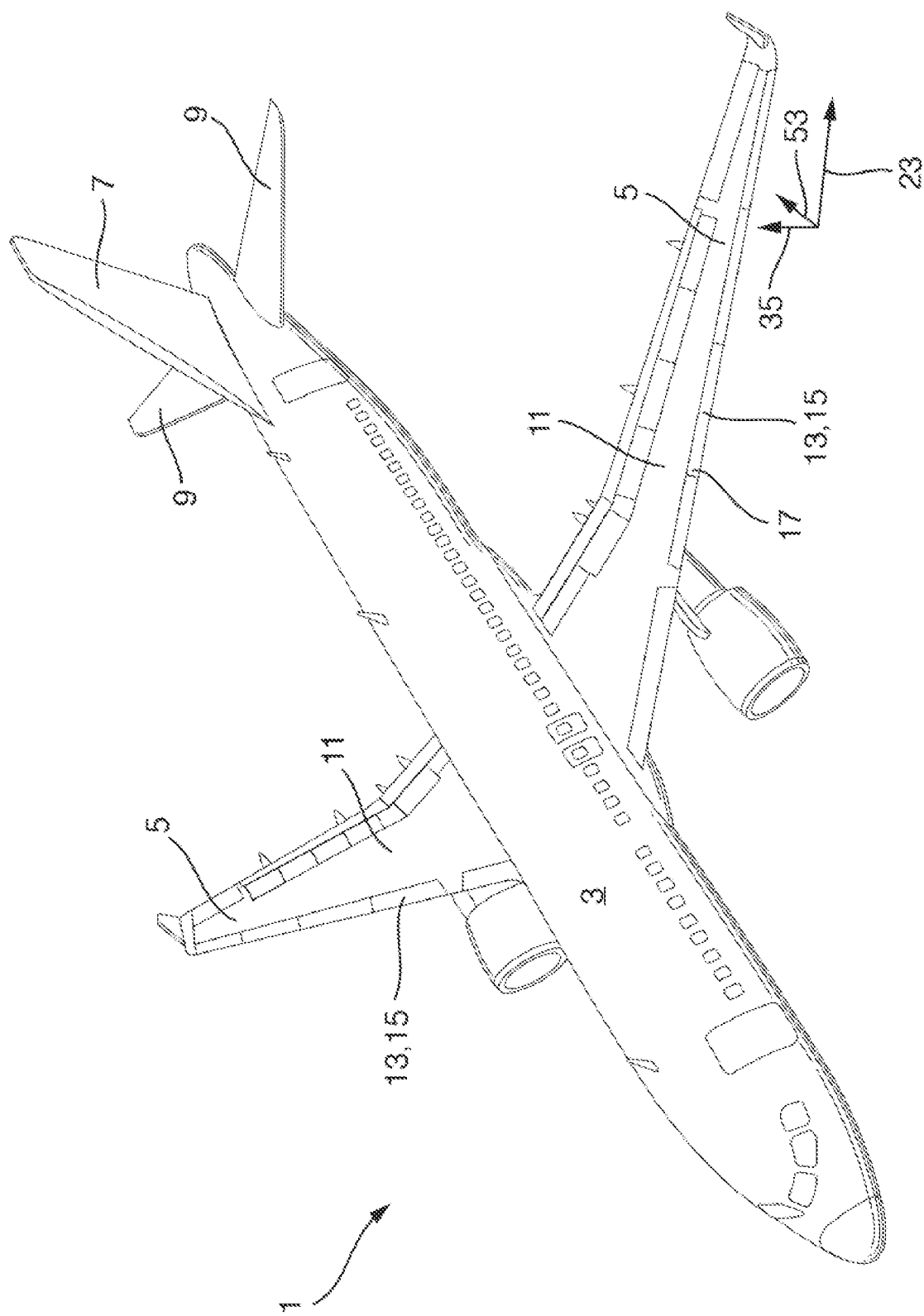

In FIG. 1 an embodiment of an aircraft 1 according to the present invention is illustrated. The aircraft 1 comprises a fuselage 3, wings 5, a vertical tail plane 7 and a horizontal tail plane 9. FIGS. 2 to 9 show in more detail several embodiments of the wings 5.

Figure 2:
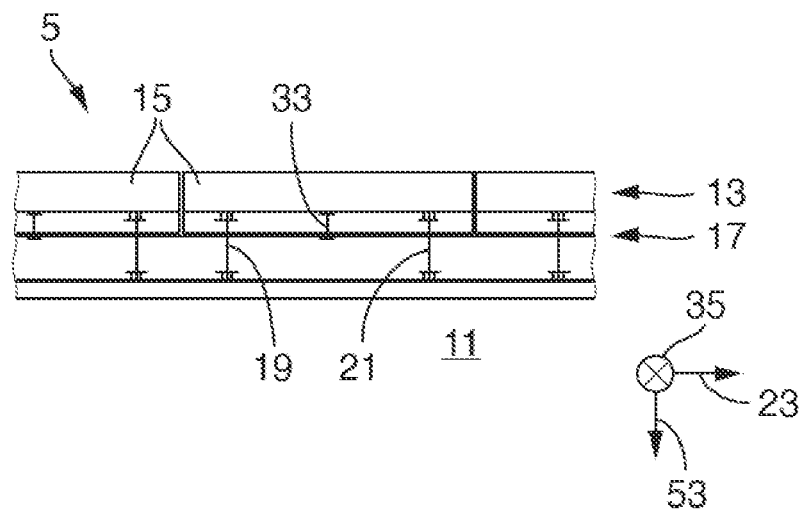
Figure 3:
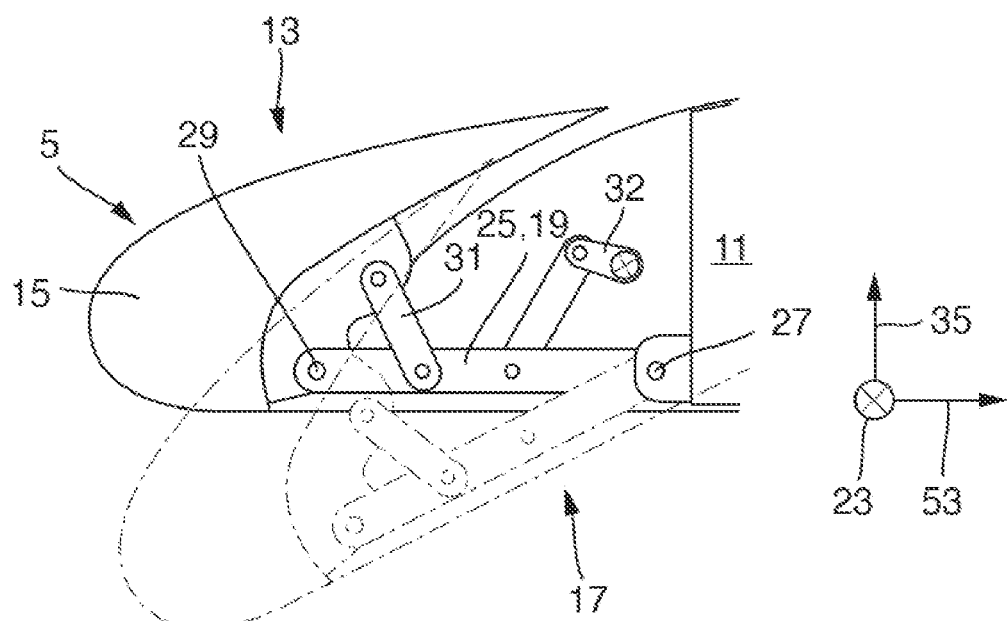

FIGS. 2 and 3 show a first embodiment of the wing 5 according to the invention. The wing 5 comprises a main wing 11 and a leading edge high lift assembly 13 movable relative to the main wing 11 to increase lift of the wing 5. The leading edge high lift assembly 13 comprises a high lift body 15 and a connection assembly 17. The high lift body 15 is a droop high lift body also referred to as droop nose. The connection assembly 17 is configured for connecting the high lift body 15 to the leading edge of the main wing 11 in such a way that the high lift body 15 is movable relative to the main wing 11 between a stowed position and a deployed position, as indicated in FIG. 3. The stowed position relates to a position where the wing profile has a lower curvature, while the deployed position relates to a position where the wing profile has a higher curvature.

The connection assembly 17 comprises a first connection element 19 that is mounted to the high lift body 15 and that is movably mounted to the main wing 11. The connection assembly 17 further comprises a second connection element 21 that is mounted to the high lift body 15 in a position spaced apart from the first connection element 19 in a span direction 23, and that is movably mounted to the main wing 11.

As shown in FIG. 3, the first and second connection elements 19, 21 are formed as rotation elements 25 in the form of hinge arms that are mounted to the high lift body 15 and that are mounted to the main wing 11 rotatably about an axis of rotation 27. Each rotation element 25 is mounted to the high lift body 15 in a fixed, non-rotatable manner by a hinge 29 arranged between the end of the rotation element 25 and the high lift body 15 and additionally by a fixing link 31 that is hinged to the rotation element 25 and that is hinged to the high lift body 15 spaced apart from the rotation element 25, so that a relative rotation of the high lift body 15 and the rotation element 25 is prevented. The axis of rotation 27 is arranged at a lower part of the main wing 11 near a lower skin and extends in parallel to the span direction 23, so that the high lift body 15 is rotated about the axis of rotation 27 when moved between the stowed position and the deployed position. The wing 5 further comprises a rotating actuator 32 for driving the rotation element 25 about the axis of rotation 27.

As indicated in FIG. 2, the connection assembly 17 further comprises an additional support device 33 arranged centrally between and spaced apart from the first and second connection elements 19, 21 and configured to support the high lift body 15 at the main wing 11 against movement or deformation of the high lift body 15 in a wing thickness direction 35 and/or in a span direction 23 relative to the main wing 11. Different embodiments of the additional support device are shown in FIGS. 4 to 15.

Figure 4:
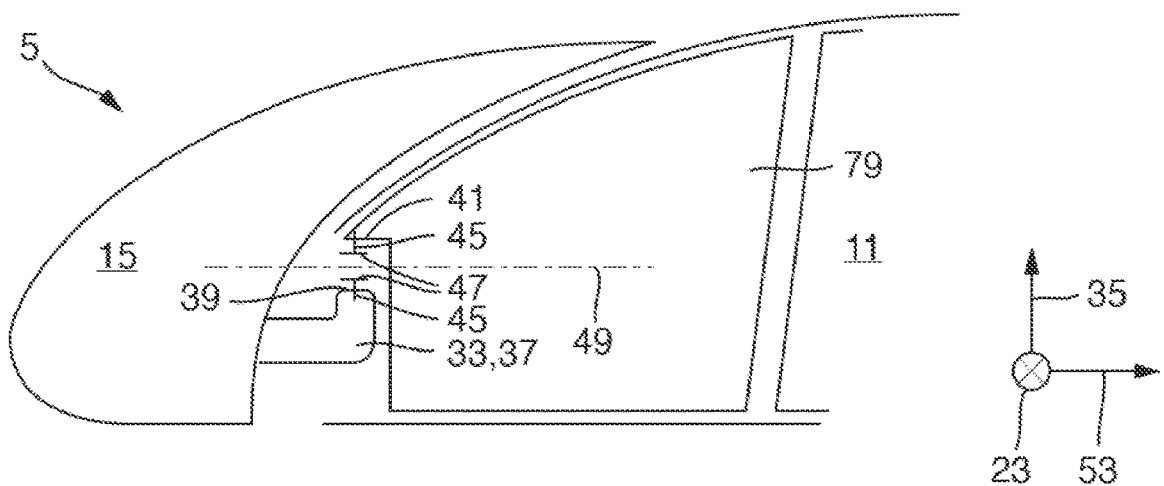

In the embodiment shown in FIG. 4, the additional support device 33 comprises a hold down device 37 configured to support the high lift body 15 at the main wing 11 against upwards movement of the high lift body 15 relative to the main wing 11, when the high lift body 15 is in the stowed position. The hold down device 37 comprises a first stop element 39 fixedly mounted to the high lift body 15 and a second stop element 41 fixedly mounted to the main wing 11. The first and second stop elements 39, 41 are configured to rest against one another when the high lift body 15 is in the stowed position to support the high lift body 15 at the main wing 11 against upwards movement of the high lift body 15 relative to the main wing 11. The first stop element 39 and the second stop element 41 are adjustable in the contact direction by including an adjustable screw 45, wherein contact is established by the screw head 47.

The first and second stop elements 39, 41 are configured to rest against one another within a contact plane 49. The contact plane 49 extends in a plane spanned by the span direction 23 and a chord direction 53, or at least has a share in the plane spanned by the span direction 23 and the chord direction 53. This means a contact force transferred between the first and second stop elements 39, 41, which results from an upwards movement of the high lift body 15 being restricted by the hold down device 37, extends normal to the contact plane 49 or at least has a share normal to the contact plane 49, so that an efficient load transfer between the first and second stop elements 39, 41 is enabled.

In the embodiments shown in FIGS. 5 to 15, the additional support device 33 comprises a lateral support device 55 configured to support the high lift body 15 at the main wing 11 against spanwise movement of the high lift body 15 relative to the main wing 11, when the high lift body 15 is moved between the stowed position and the deployed position, including when the high lift body 15 is in the stowed position and in the deployed position. The lateral support device 55 comprises a roller or slide bearing 57 including at least one roller 59 mounted to one of the high lift body 15 and the main wing 11, and engaging a corresponding guide surface 63 at the other one of the high lift body 15 and the main wing 11, so that the roller 59 rolls along the guide surface 63 when the high lift body 15 is moved between the stowed position and the deployed position, thereby providing a load support in the span direction 23. The guide surface 63 and a rotation axis 65 of the roller 59 extend in a chord plane spanned by the chord direction 53 and the wing thickness direction 35.

Figure 5:
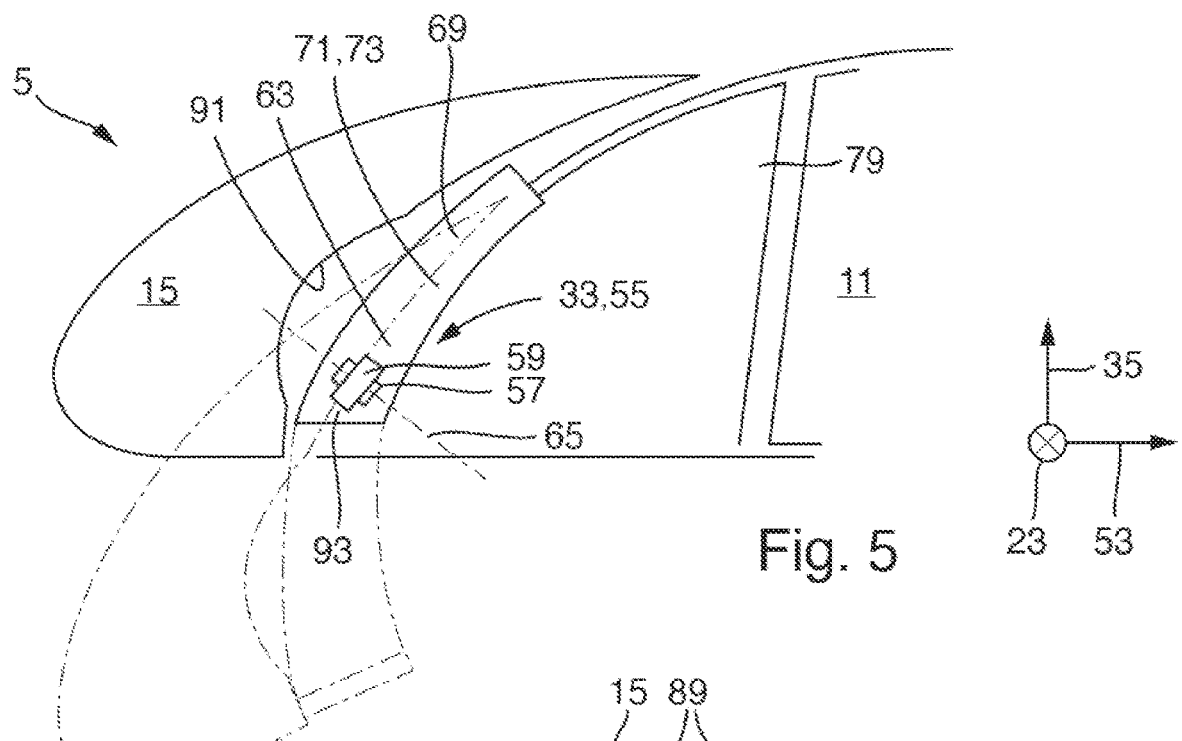
Figure 6:
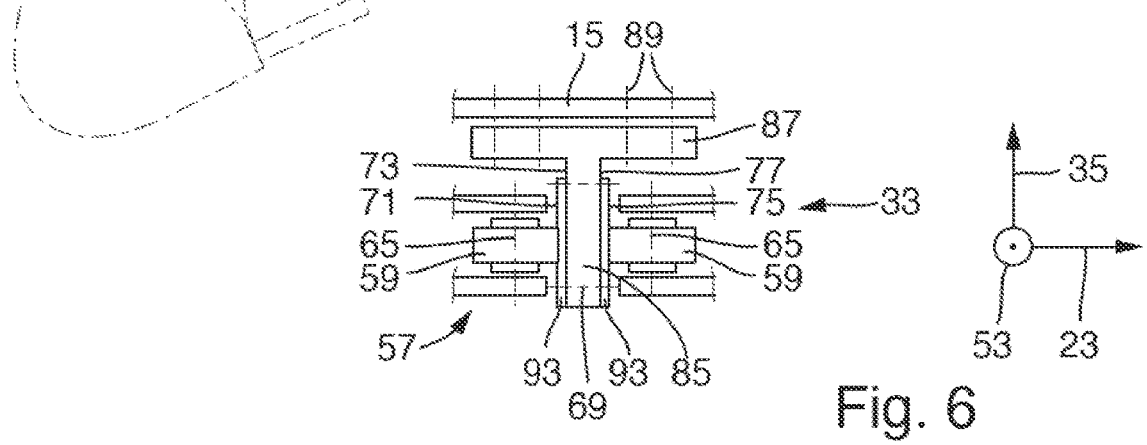

FIGS. 5 and 6 show an embodiment, wherein the lateral support device 55 comprises a first blade 69 extending in the chord plane, mounted to the high lift body 15 and having a first guide surface 71 at a first side 73 and a second guide surface 75 at an opposite second side 77. The lateral support device 55 further comprises a pair of rollers 59 mounted a rib 79 of the main wing 11 and engaging the first and second guide surfaces 71, 75 from opposite sides. As shown, e.g., in FIG. 6, the first blade 69 has a T-shaped profile including a blade portion 85 having the guide surfaces 71, 75, and a flange portion 87 mounted to the high lift body 15, specifically to the lower and/or rearward panel 91 of high lift body 15, e.g., by bolts 89.

FIGS. 7 and 8 show an alternative embodiment, wherein the lateral support device 55 comprises a first blade 69 extending in the chord plane, mounted to a rib of 79 the main wing 11, and having a first guide surface 71 at a first side 73 and a second guide surface 75 at an opposite second side 77. The lateral support device 55 further comprises a pair of rollers 59 mounted to the high lift body 15 and engaging the first and second guide surfaces 71, 75 from opposite sides. The first blade 69 is formed as or integrally formed with a rib of the main wing 11 extending in a chord direction 53.

FIG. 9 shows an alternative embodiment slightly different to that of FIGS. 7 and 8, wherein the lateral support device 55 comprises a first blade 69 and a second blade 81 both mounted to a rib 79 of the main wing 11 in parallel to one another and having a first guide surface 71 and a second guide surface 75 facing towards each other and extending in the chord plane. The lateral support device 55 further comprises a roller 59 mounted to the high lift body 15 and guided between the first and second blades 69, 81 in engagement with the first guide surface 71 and/or the second guide surface 75. The first blade 69 and the second blade 81 are formed as or integrally formed with a rib of the main wing 11 extending in a chord direction 53.

In the embodiments shown in FIGS. 5 to 9, a contact plate 93 formed of a hard material, such as steel, titanium, or ceramic, is mounted to the first and second blades 69, 81 and includes the first and second guiding surfaces 71, 75 to reinforce the first and second guiding surfaces 71 75 as in the present embodiments the first and second blades 69, 81 are formed of a softer material, namely aluminum.

FIGS. 10 to 13 show further embodiments, where a first stop element 39 is mounted to or formed integrally with the first and/or second blade 69, 81. Additionally, a second stop element 41 is mounted to or formed integrally with a rib 79 of the main wing 11.

Figure 10:
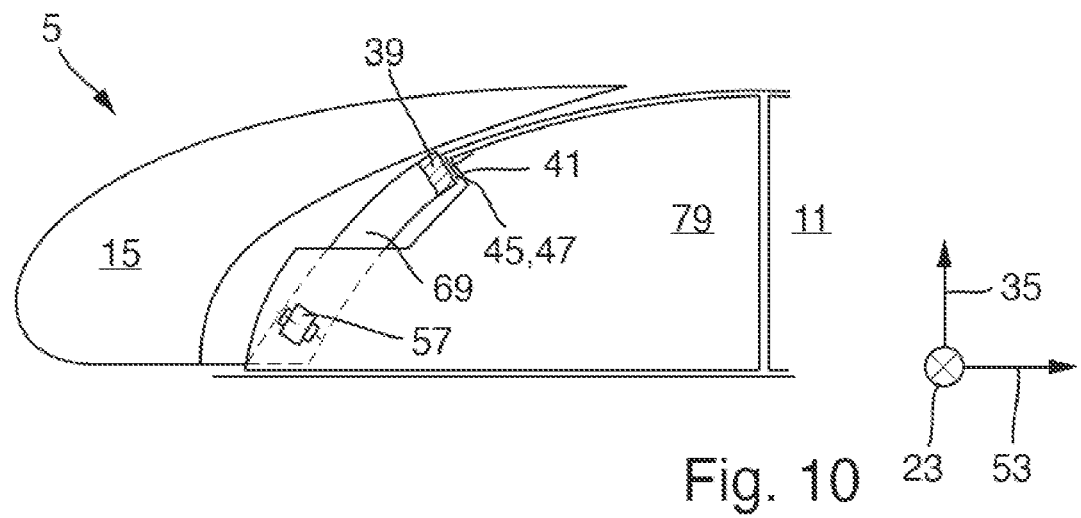

In the embodiment shown in FIG. 10, the first stop element 39 is formed at the upper or rear end of the first blade 69 at the head end of the first blade 69. Additionally, the second stop element 41 is formed as a chordwise and/or spanwise extending projection at a rib 79 of the main wing 11.

Figure 11:
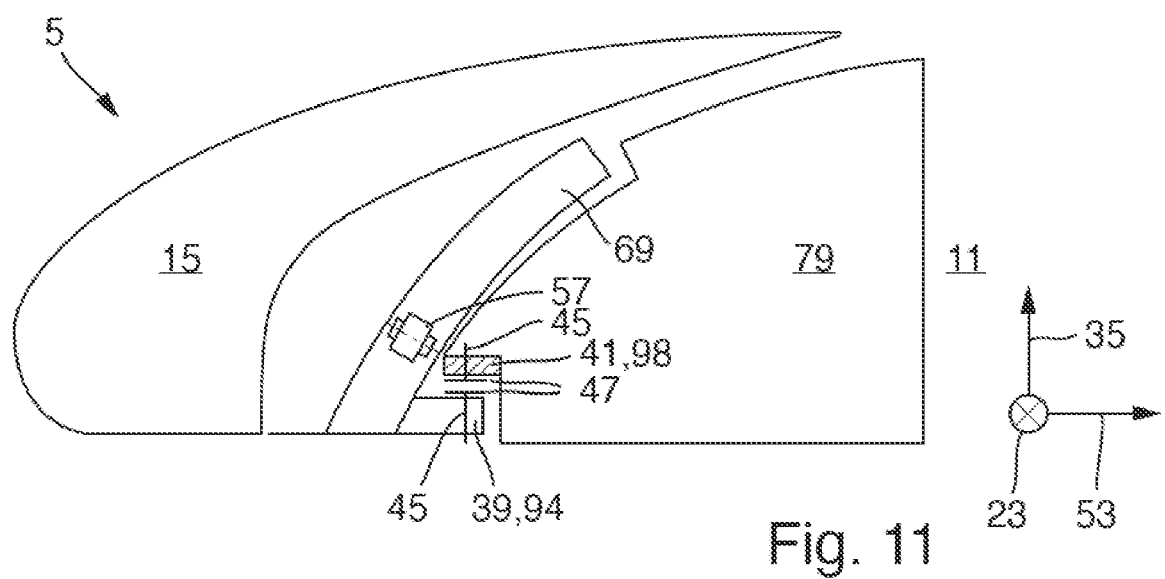

In the embodiment shown in FIG. 11, the first stop element 39 is formed as a chordwise extension 94 of the first blade 69 and is formed at the lower or front end of the first blade 69. Additionally, the second stop element 41 is formed as a chordwise extending projection 98 at a rib 79 of the main wing 11.

Figure 12:
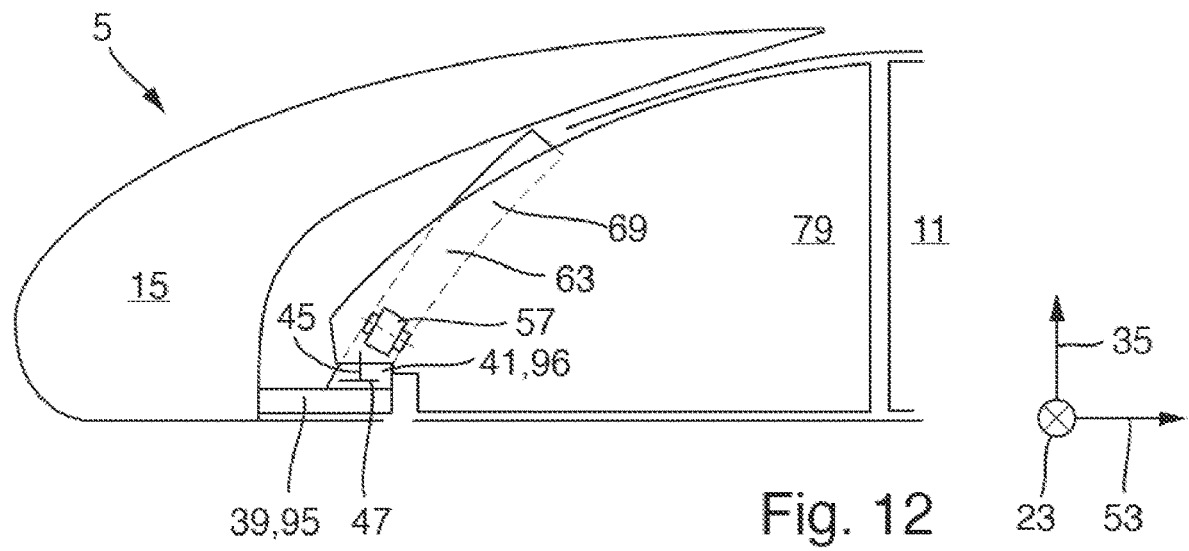
Figure 13:
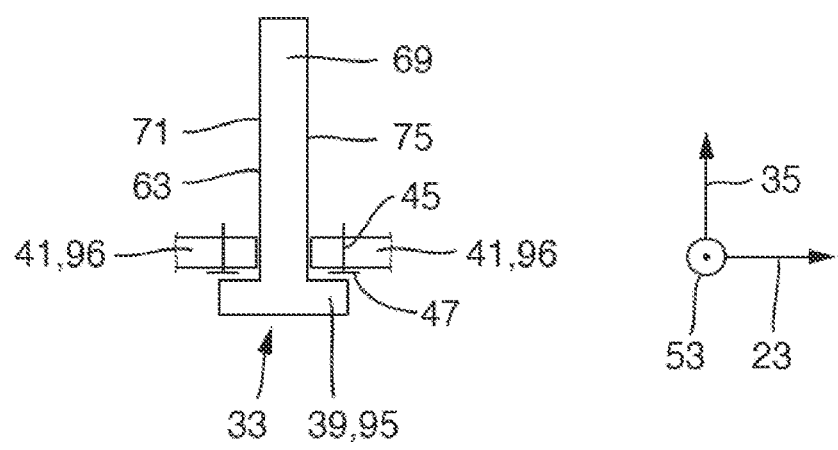

In the embodiment shown in FIGS. 12 and 13, the first stop element 39 includes a first stop flange 95 formed at the lower or front end of the first blade 69 and extending in the span direction. Additionally, the second stop element 41 includes a second stop flange 96 formed at a rib 79 of the main wing 11 and extending in the span direction 23.

Figure 14:
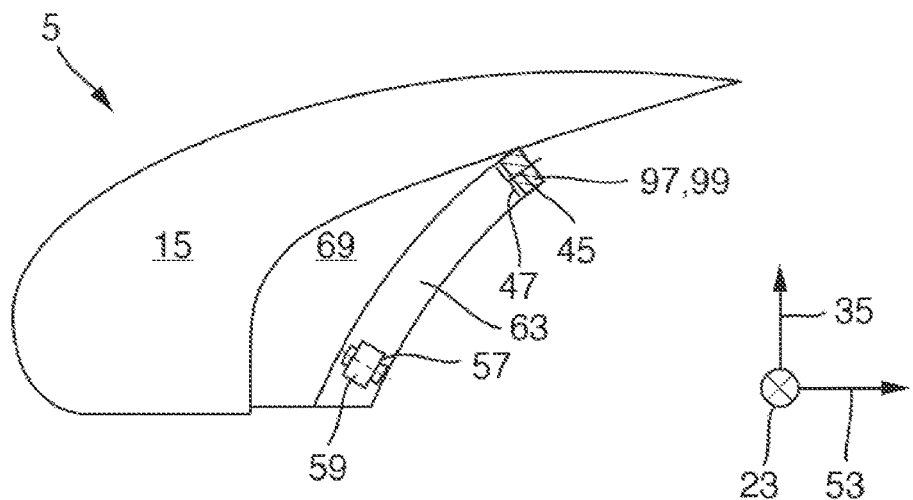
Figure 15:
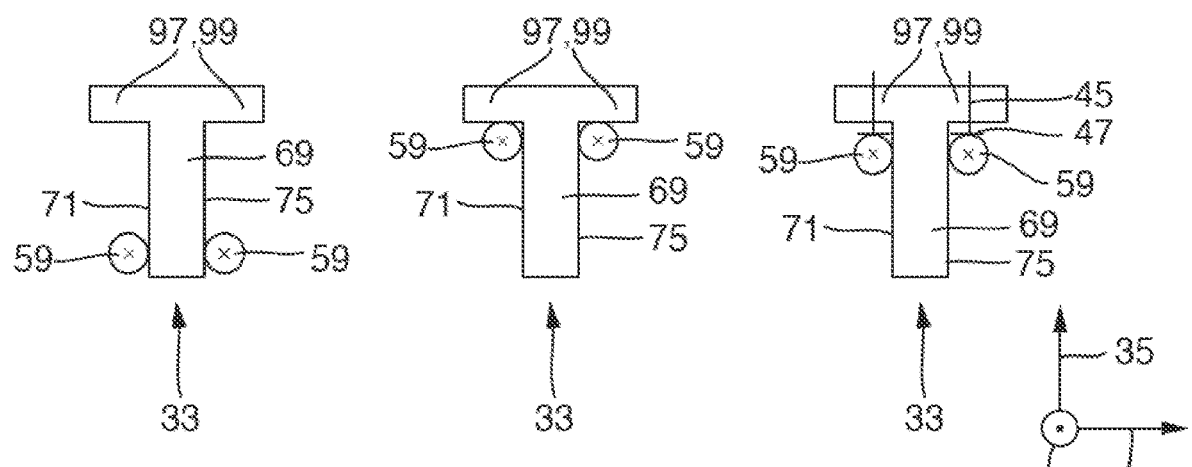

FIGS. 14 and 15 show a further embodiment, where the additional support device 33 comprises a deployment stop 97 limiting deployment movement of the high lift body 15 and thereby defining the deployed position of the high lift body 15. The deployment stop 97 comprises two opposite lateral projections 99 extending from the first and second guide surface 71, 75 of the first blade 69 in the span direction 23 and running against rollers 59 when the high lift body 15 is in the deployed position.

By the additional support according to the invention as described before, bending of the high lift body 15 between the first and second connection elements 19, 21 under air loads and/or spanwise movement of the high lift body 15 can be reliably restricted, so that the leading edge high lift assembly 13 is particularly simple, lightweight and aerodynamically advantageous.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing, and
a leading edge high lift assembly comprising
a high lift body, and
a connection assembly connecting the high lift body to the main wing such that the high lift body is movable relative to the main wing between a stowed position and a deployed position,
wherein the connection assembly comprises a first connection element that is mounted to the high lift body and that is movably mounted to the main wing,
wherein the connection assembly comprises a second connection element that is mounted to the high lift body in a position spaced apart from the first connection element in a span direction, and that is movably mounted to the main wing,
wherein the connection assembly comprises an additional support device arranged spaced apart from the first and second connection elements and configured to support the high lift body at the main wing against movement or deformation of the high lift body relative to the main wing
wherein the additional support device comprises a hold down device configured to support the high lift body at the main wing against upwards movement of the high lift body relative to the main wing when the high lift body is in the stowed position,
wherein the hold down device comprises a first stop element mounted to the high lift body and a second stop element mounted to the main wing,
wherein the first and second stop elements are configured to rest against one another when the high lift body is in the stowed position, and
wherein the additional support device comprises a lateral support device configured to support the high lift body at the main wing against spanwise movement of the high lift body relative to the main wing when the high lift body is moved between the stowed position and the deployed position.

2. The wing according to claim 1, wherein the additional support device is arranged between the first connection element and the second connection element.

3. The wing according to claim 1,
wherein the first and second stop elements are configured to rest against one another within a contact plane, and wherein the contact plane extends or has a share in a plane spanned by the span direction and a chord direction.

4. The wing according to claim 1,
wherein the lateral support device comprises a roller or slide bearing including at least one roller or slide pad mounted to one of the high lift body and the main wing, and engaging a corresponding guide surface at the other one of the high lift body and the main wing, and
wherein at least one of the guide surface or a rotation axis of the roller extend in a chord plane spanned by a chord direction and a wing thickness direction.

5. The wing according to claim 3,
wherein the lateral support device comprises a first blade mounted to the high lift body and having a first guide surface at a first side and a second guide surface at an opposite second side, and a pair of rollers or slide pads mounted to the main wing and engaging at least one of the first or second guide surfaces from opposite sides, or
wherein the lateral support device comprises a first blade and a second blade both mounted to the high lift body in parallel to one another and having a first guide surface and a second guide surface facing towards each other, and a roller or slide pad mounted to the main wing and guided between the first and second blades in engagement with at least one of the first guide surface or the second guide surface, or
wherein the lateral support device comprises a first blade mounted to the main wing and having a first guide surface at a first side and a second guide surface at an opposite second side, and a pair of rollers or slide pads mounted to the high lift body and engaging at least one of the first or second guide surfaces from opposite sides, or
wherein the lateral support device comprises a first blade and a second blade, both mounted to the main wing in parallel to one another and having a first guide surface and a second guide surface facing towards each other, and a roller or slide pad mounted to the high lift body and guided between the first and second blades in engagement with at least one of the first guide surface and/or the second guide surface.

6. The wing according to claim 5, wherein at least one of at least one of the first blade or the second blade have a profile including a blade portion and a flange portion mounted to the high lift body or to the main wing, or at least one of the first blade or the second blade is formed as or integrally formed with a rib of the main wing.

7. The wing according to claim 5, wherein at least one contact plate is mounted to at least one of the first or second blades and includes at least one of the first or second guiding surfaces.

8. The wing according to claim 1, wherein at least one of the first stop element is mounted to or formed integrally with at least one of a first blade or a second blade, or the second stop element is mounted to or formed integrally with a rib of the main wing.

9. The wing according to claim 8,
wherein at least one of
the first stop element includes a first stop flange formed at the lower or front end of at least one of the first or second blade and extending in the span direction, or
the second stop element includes a second stop flange formed at a rib of the main wing and extending in the span direction, or wherein at least one of
the first stop element is formed as a chordwise extension of at least one of the first or second blade and is formed at the lower or front end of at least one of the first or second blade, or
wherein the second stop element is formed as a chordwise extending projection at a rib of the main wing, or
wherein at least one of
the first stop element is formed at the upper or rear end of at least one of the first or second blade, or
the second stop element is formed as at least one of a chordwise or spanwise extending projection at a rib of the main wing.

10. The wing according to claim 1,
wherein the additional support device comprises a deployment stop limiting deployment movement of the high lift body and thereby defining the deployed position of the high lift body, and
wherein the deployment stop comprises at least one lateral projection extending from at least one of a first guide surface or a second guide surface of at least one of a first blade or a second blade in the span direction and running against at least one roller or slide pad when the high lift body is in the deployed position.

11. The wing according to claim 1, wherein the high lift body is formed as a droop nose,
wherein the first connection element is formed as a first rotation element mounted to the high lift body and mounted to the main wing rotatably about a first rotation axis, and
wherein the second connection element is formed as a second rotation element mounted to the high lift body and mounted to the main wing rotatably about a second rotation axis.

12. A leading edge high lift assembly for a wing according claim 1, comprising
a high lift body, and
a connection assembly for connecting the high lift body to a main wing such that the high lift body is movable relative to the main wing between a stowed position and a deployed position,
wherein the connection assembly comprises a first connection element that is mounted to the high lift body and that is configured to be movably mounted to the main wing,
wherein the connection assembly comprises a second connection element that is mounted to the high lift body in a position spaced apart from the first connection element in a span direction, and that is configured to be movably mounted to the main wing,
wherein the connection assembly comprises an additional support device arranged spaced apart from the first and second connection elements and configured to support the high lift body at the main wing against movement of the high lift body relative to the main wing.

13. An aircraft comprising a leading edge high lift assembly according to claim 12.

14. An aircraft comprising a wing according to claim 1.

15. The wing according to claim 1, wherein the first and second stop elements extend in a wing thickness direction, and
wherein the first and second stop elements are axially aligned in the wing thickness direction.

* * * * *